(12) United States Patent
Kraft et al.

(10) Patent No.: US 12,566,120 B2
(45) Date of Patent: Mar. 3, 2026

(54) PARTICULATE MATTER DETECTOR AND METHOD FOR DETECTING PARTICULATE MATTER

(71) Applicant: ams-OSRAM AG, Premstätten (AT)

(72) Inventors: Jochen Kraft, Bruck an der Mur (AT); Jaka Pribosek, Villach (AT); Andreas Tortschanoff, Villach (AT)

(73) Assignee: ams-OSRAM AG, Premstätten (AT)

( * ) Notice: Subject to any disclaimer, the term of this patent is extended or adjusted under 35 U.S.C. 154(b) by 81 days.

(21) Appl. No.: 18/573,961

(22) PCT Filed: Jun. 24, 2022

(86) PCT No.: PCT/EP2022/067347
§ 371 (c)(1),
(2) Date: Dec. 22, 2023

(87) PCT Pub. No.: WO2022/269034
PCT Pub. Date: Dec. 29, 2022

(65) Prior Publication Data
US 2024/0210296 A1 Jun. 27, 2024

(30) Foreign Application Priority Data
Jun. 25, 2021 (DE) ...................... 10 2021 116 522.9

(51) Int. Cl.
*G01N 15/0205* (2024.01)
*G01N 15/00* (2024.01)
(Continued)

(52) U.S. Cl.
CPC ....... *G01N 15/0205* (2013.01); *G01N 15/075* (2024.01); *G02B 6/12* (2013.01); *G01N 2015/035* (2013.01); *G02B 2006/1215* (2013.01)

(58) Field of Classification Search
CPC ............. G01N 15/0205; G01N 15/075; G01N 2015/035; G01N 2015/0046; G01N 21/552; G02B 6/12; G02B 2006/1215
See application file for complete search history.

(56) References Cited

U.S. PATENT DOCUMENTS

| | | | | | |
|---|---|---|---|---|---|
| 5,887,089 | A | * | 3/1999 | Deacon | ................... G02F 1/011 |
| | | | | | 385/10 |
| 5,922,537 | A | * | 7/1999 | Ewart | .............. G01N 33/54326 |
| | | | | | 435/7.1 |

(Continued)

FOREIGN PATENT DOCUMENTS

| | | |
|---|---|---|
| EP | 2 835 674 A1 | 2/2015 |
| JP | 2005-161514 A | 6/2005 |

(Continued)

OTHER PUBLICATIONS

L. N. Ng et al., "Forces on a Rayleigh Particle in the Cover Region of a Planar Waveguide", Mar. 2000, Journal of Lightwave Technology, vol. 18, No. 3 (Year: 2000).*

(Continued)

*Primary Examiner* — Tarifur R Chowdhury
*Assistant Examiner* — Joshua M Carlson
(74) *Attorney, Agent, or Firm* — HAUPTMAN HAM, LLP

(57) ABSTRACT
A particulate matter detector includes a light emitter configured to emit light, a first, a second and a third waveguide, a waveguide splitter, a detector, and a controller. The third waveguide is free of cladding. The first waveguide is coupled to the light emitter and guides emitted light toward the waveguide splitter. The first waveguide includes an interrogation region formed by a cladding-free surface of the first waveguide. During a measurement phase, a first intensity of the light in the first waveguide is set for determining a change in the intensity of the light detected by the detector.

(Continued)

An indication of an opacity of the surface of the first waveguide with accumulated particulate matter is output. During a cleaning phase, a second intensity of the light in the first waveguide is set for directing the accumulated particulate matter from the interrogation region to the third waveguide via optical forces.

15 Claims, 2 Drawing Sheets

(51) Int. Cl.
  *G01N 15/075* (2024.01)
  *G02B 6/12* (2006.01)

(56) References Cited

U.S. PATENT DOCUMENTS

| | | | | |
|---|---|---|---|---|
| 6,540,895 | B1 * | 4/2003 | Spence | G01N 15/14 |
| | | | | 204/600 |
| 8,463,083 | B2 | 6/2013 | Egalon | |
| 8,494,336 | B2 * | 7/2013 | Jenkins | G02B 6/136 |
| | | | | 385/47 |
| 9,242,248 | B2 | 1/2016 | Astratov | |
| 11,774,344 | B2 * | 10/2023 | Li | G01N 15/1434 |
| | | | | 356/338 |
| 2012/0268731 | A1 * | 10/2012 | Zhu | G01N 21/7746 |
| | | | | 356/73 |

| | | | | |
|---|---|---|---|---|
| 2016/0370282 | A1 * | 12/2016 | Zhan | G01N 15/1434 |
| 2017/0059469 | A1 * | 3/2017 | Hutter | G01N 33/497 |
| 2018/0191129 | A1 * | 7/2018 | Wheeler | H01S 5/02235 |

FOREIGN PATENT DOCUMENTS

| | | |
|---|---|---|
| WO | 2009/088492 A1 | 7/2009 |
| WO | 2010/030939 A1 | 3/2010 |
| WO | 2012/033409 A1 | 3/2012 |

OTHER PUBLICATIONS

International Search Report issued on Oct. 10, 2022, for corresponding International Patent Application No. PCT/EP2022/067347 (3 pages).

Written Opinion issued on Oct. 10, 2022, for corresponding International Patent Application No. PCT/EP2022/067347 (6 pages).

Buchberger et al., "Single Particle Detector Using the Evanescent Field of a Silicon Nitride Waveguide," 2019 IEEE Sensors Proceedings, Oct. 27-30, 2019, ISBN 978-1-7281-1634-1 (7 pages).

Buchberger et al., "Silicon Nitride Photonic Particle Detector Experiments and Model Assessment," IEEE Sensors Journal, Jun. 8, 2021, vol. 21, No. 17, pp. 18829-18836; Cited in NPL Nos. 1 and 2.

Vereecke et al., "Influence of beam incidence angle on dry laser cleaning of surface particles," Applied Surface Science, Mar. 1, 2000, vol. 157, No. 1-2, pp. 67-73; Cited in NPL Nos. 1 and 2.

* cited by examiner

PARTICULATE MATTER DETECTOR AND METHOD FOR DETECTING PARTICULATE MATTER

CROSS REFERENCE TO RELATED APPLICATION

This application is a National Stage of International Application No. PCT/EP2022/067347, filed on Jun. 24, 2022, which designates the United States and was published in Europe, and which claims priority to German Patent Application No. 10 2021 116 522.9, filed on Jun. 25, 2021, in the German Patent Office. All of the aforementioned applications are hereby incorporated by reference in their entireties.

The present disclosure relates to a particulate matter detector and to a method for detecting particulate matter.

Present-day high-sensitivity particulate matter (PM) detectors typically rely on the light-matter interaction in the evanescent field, produced by total internal reflection in specifically designed single- or multi-mode optical waveguides. The main requirements for such a detector are i) a single particle detection capability, ii) a compact integrated design, iii) long operational life times, iv) high sensitivity and a broad measurement range, v) high energy efficiency, and vi) the ability to be mass-produced, preferably using CMOS technology.

One major obstacle particularly concerning the desirable long life times for mass-sensitive PM sensors is the loading effect caused by continuous deposition of particles on the waveguide. This accumulation of particles is the main reason for limited operational life time of existing sensors and for a consequent gradual decrease of the sensor sensitivity, even leading to an insufficient sensitivity. State-of-the-art sensors overcome this problem either via a removal of the sensor from its application with subsequent external cleaning, or via the usage of disposable sensors. Further approaches include mechanical techniques utilizing high speed air or liquid streams and/or ultrasonic cleaning, as well as electrostatic cleaning.

Thus, existing solutions suffer from a danger of recontamination with new particles, as well as for the electrostatic cleaning case requiring high voltages in the order of several kilovolts and creating substantial polymer film waste for each decontamination process. Existing approaches are therefore not practical and show a clear demand for a more integrated solution for this issue.

It is an object to provide an improved concept of a particulate matter detector, which overcomes the limitations of present-day solutions.

This object is achieved by the subject-matter of the independent claims. Further developments and embodiments are described in the dependent claims.

The improved concept is based on the idea of using the evanescent field of the waveguide not only for detection but also for exerting optical forces onto the particles after detection, thus removing them from the interrogation region of the sensor. This way, a technique that allows contactless particle removal from the surface is realized. In particular, the improved concept utilizes a split waveguide structure, in which one arm is used as a particle dump while the other arm functions as a measurement arm. Therein, the improved concept cannot only be applied to sensors surrounded by aqueous solutions, but a detector according to the improved concept can be particularly designed to work in gases, e.g. air, as an evanescent field-based sensor.

Specifically, a particulate matter detector according to the improved concept comprises a light emitter configured to emit light, a waveguide structure formed by a first, a second and a third waveguide, the third waveguide being free of cladding, and a waveguide splitter. The particulate matter detector further comprises a detector and a controller. The first waveguide is coupled to the light emitter and is configured to guide the emitted light towards the waveguide splitter, the first waveguide comprising an active interrogation region formed by a cladding-free surface of the first waveguide, the surface being exposed to a gaseous environment and configured to accumulate directly thereon particulate matter from the gaseous environment. The waveguide splitter couples the interrogation region of the first waveguide to the second waveguide and to the third waveguide. The detector is coupled to the second waveguide and configured to detect an intensity of light that is split from the interrogation region into the second waveguide by the waveguide splitter.

The controller is configured to, during a measurement phase, set a first intensity of the light coupled into the first waveguide, determine a change in the intensity of the light detected by the detector, and output an indication of an opacity of the surface of the first waveguide with the accumulated particulate matter thereon based on the determined change. Furthermore, during a cleaning phase, the controller is configured to set a second intensity of the light coupled into the first waveguide that is larger than the first intensity for directing the accumulated particulate matter from the interrogation region to the third waveguide via optical forces.

For example, the light emitter, the first, second and third waveguides, the waveguide splitter, the detector and the controller are arranged on a common substrate, e.g. a semiconductor substrate such as a chip or a wafer or a glass substrate. For example, the waveguides are associated with the substrate. Alternatively, the light emitter, the controller and/or the detector can be external components not arranged on a common substrate with the waveguides and the splitter.

The light emitter is an optical light source configured to emit light along a light path. For example, the light emitter is a semiconductor laser, such as a laser diode, or a light-emitting diode, LED. The particulate matter detector can further comprise a first optical grating disposed along the light path and configured to structure the light received from the light emitter into structured light and pass the structured light into the waveguide structure, more specifically into the first waveguide. Similarly, the particulate matter detector can further comprise a second optical grating disposed along the light path and configured to receive the structured light from the waveguide structure, more specifically from the second waveguide, and pass the structured light to the detector. The detector is an optical detector such as a photodiode, for example, that is photosensitive at an emission wavelength of the light emitter and a guiding wavelength of the waveguide structure.

The waveguide structure can be formed from a dielectric. The first waveguide has an active interrogation region formed by a cladding-free surface of the first waveguide that is exposed to a gaseous environment, e.g. air, and is configured to accumulate on the surface particulate matter from the gaseous environment. The first waveguide of the waveguide structure can have a cladding between the light source and the active interrogation region. The interrogation region and the portion of the first waveguide between the interrogation region and the waveguide splitter is cladding-free.

The first waveguide can be planar or have a circular cross-section, for instance. Light from the light emitter propagates through the waveguides of the waveguide structure with low loss due to the principle of total internal reflection, which is a well-established concept. In addition, the light propagating through the waveguide further induces an evanescent field which decays exponentially away from the exposed surface. To this end, a thickness of the first waveguide within the active interrogation region, and optionally between the interrogation region and the waveguide splitter, is in the order of the wavelength of the light within said waveguide, e.g. about 1 μm. For example, the interrogation region extends to the waveguide splitter.

Particulate matter that enters the evanescent field, e.g. by accumulating on the cladding-free surface, within the active interrogation region disturbs the evanescent wave, resulting in a decrease of the propagating mode intensity and consequently in a reduction of the light intensity remaining in the first waveguide that is guided towards the waveguide splitter. This intensity change is detected by the detector that is arranged at the end of the second waveguide of the waveguide structure. To this end, the waveguide splitter is configured to couple the interrogation region of the first waveguide to the second waveguide. A sudden drop in signal at the detector corresponds to a particle deposition or accumulation on the surface within the active interrogation area, while the amplitude of the drop corresponds to the approximate size of the particles, opening the possibility to measure both number of particles and their size distribution.

The second waveguide can likewise be planar or have a circular cross-section, for instance. In particular, the second waveguide can have a cladding that extends between the waveguide splitter and the detector or the aforementioned optional second optical grating. The waveguide splitter is further configured to couple the interrogation region of the first waveguide to the third waveguide. For example, the waveguide splitter is configured to selectively couple light into the second and third waveguides, or it is characterized by a fixed splitting ratio that may be wavelength and/or polarization dependent, for instance. The third waveguide can likewise be planar or have a circular cross-section, for instance. In particular, the third waveguide has a cladding-free portion that extends from the waveguide splitter.

The controller controls an emission output intensity of the light emitter, for instance. Alternatively, the controller can be configured to directly control an intensity of light within the first waveguide, e.g. via controlling a coupling efficiency of an input coupler arranged between the light emitter and the first waveguide. During a measurement phase, a low output intensity, i.e. the first intensity, within the first waveguide is set such that an optical intensity within the interrogation region is achieved that is optimized according to the needs of particulate matter sensing without exerting optical forces that would be strong enough to move particles out of the active interrogation region during the measurement. The controller can be further configured to determine a change in the intensity of the light detected by the detector, and output an indication of an opacity of the surface of the first waveguide with the accumulated particulate matter thereon based on the determined change.

The cleaning phase is initiated either after the measurement phase is completed, or based on a specific criterion, e.g. a total attenuation within the interrogation region. During the cleaning phase, a high output intensity, i.e. the second intensity, within the first waveguide is set, e.g. more than 50 mW, such that a strong optical force is exerted onto particles accumulated on the cladding-free surface of the first waveguide and all accumulated particles are moved along the first waveguide through the waveguide splitter to the third waveguide, which can be understood as a particle dump arm. The typical velocities of the particles can be in the order of 10 μm/s.

A particulate matter detector according to the improved concept allows for sensing ultrafine particulate matter, e.g. PM2.5, and additionally incorporating a decontamination mechanism to minimize the loading effect of continuous particle deposition. The proposed cleaning mechanism relies on optical forces with pico-Newton magnitude, generated by the radiation pressure on a small particle illuminated by an evanescent electromagnetic wave. This approached exploits the fact that optical forces exerted on the particles can cause the motion of the particles along the waveguide at speeds up to 15 μm/s. In particular, the present disclosure utilizes these forces for surface cleaning of the first waveguides having the active interrogation region.

To this end, the waveguide structure is split in two arms, optimized such that during the cleaning phase, all particles are dragged into the waveguide branch formed by the third waveguide. This decontaminates the active sensing area and allows the other, uncompromised waveguide arm, i.e. the second waveguide, to be used for measurement. The advantage of the proposed principle is the fact that the optical force is controlled by the intensity of the propagating mode, which allows cleaning operation on demand. The particulate matter detector according to the improved concept hence extends the sensor life and allows constant sensor sensitivity and optimal sensor performance over long time.

In some embodiments, the controller determines the indication of the opacity by comparing the detected intensity with the first intensity.

For example, the controller for outputting an indication of the opacity of the surface of the first waveguide with the accumulated particulate matter thereon, the controller can be configured to compare the detected intensity with a known intensity, such as an output intensity of the light emitter, and calculate an energy loss and/or a correlated value.

In some embodiments, the first waveguide is coupled to the light emitter via a first grating coupler, and/or the second waveguide is coupled to the detector via a second grating coupler.

If the light emitter is not directly waveguide coupled and the waveguide structure, formed by the first, second and third waveguides, is integrated into the substrate, for example, optical grating couplers provide a high-efficient optical coupling from free space into the waveguide and vice versa. For example, the substrate of the detector is a glass substrate, in which a first and a second optical grating and the waveguide structure is formed in an integral manner by means of regions with varying refractive indices. For instance, the waveguide structure may have a lower refractive index compared to the substrate. Alternatively, said optical elements can be manufactured from dielectric materials, such as silica, on a common silicon substrate.

In some embodiments, a length of the third waveguide is larger than a length of the second waveguide. Furthermore, the third waveguide can form a spiral or a meander trap.

The third waveguide effectively acting as a particle dump arm, or particle trap arm, can have a substantially larger length compared to the second waveguide acting as the measurement arm. This way, a reservoir for particulate matter to be transported away from the interrogation region of the first waveguide can be efficiently enhanced. To achieve this, the third waveguide can be manufactured such that it spirals or forms the aforementioned meander on the common substrate.

In some embodiments, the third waveguide at least in some regions is thinned down.

The third waveguide can be thinned down in a particle dump region, thus increasing the evanescent field and therefore producing stronger optical forces acting on the accumulated particles. Thinned down in this context refers to the waveguide being thinner, or flatter, e.g. tapered, compared to other regions of the waveguide structure, particularly the second waveguide.

In some embodiments, the first waveguide at least in a portion of the interrogation region is thinned down.

Likewise, the first waveguide in the interrogation region can have a reduced cross-section for enhancing the evanescent field and making the detector more sensitive for smaller particulate matter, for instance. This way, the particle transport during the cleaning phase can be likewise enhanced due to the increased evanescent field strength at the exposed surface of the first waveguide.

In some embodiments, the particulate matter detector further comprises an enclosure that covers at least a portion of the third waveguide.

This way, particularly during the measurement phase, in which comparably low optical power is propagating through the waveguides not exerting any significant optical force onto particles, a re-contamination of particles accumulated on the third waveguide can be prevented by means of an enclosure even when loosening from the waveguide due to an end of the cleaning phase.

In some embodiments, the particulate matter detector further comprises means to apply electrophoresis and/or thermophoresis to at least a portion of the third waveguide.

For further enhancing the cleaning phase and to ensure that the particles remain accumulated on the third waveguide also outside of the cleaning phase, the aforementioned optical trap can be combined with other techniques of trapping that help keeping particles in place, e.g. based on electro- or thermophoresis.

In some embodiments, the second waveguide comprises a cladding.

For preventing particles from being moved to the second waveguide, the latter can comprise a cladding such that an evanescent field strength at its surface is small enough not to exert any significant optical forces onto the particles in this region. This way, an exclusive transport of particles to the third waveguide can be ensured.

In some embodiments, the waveguide splitter is one of: a passive waveguide splitter having a fixed energy splitting ratio, wherein a higher energy portion is split from the interrogation region into the third waveguide; a selective waveguide splitter characterized by a polarization or wavelength dependent energy splitting ratio; and an active waveguide splitter operable to selectively couple light from the interrogation region into the second and third waveguide.

Depending on the specific application requirements, different types of waveguide splitters can be employed. Firstly, a passive waveguide splitter having a fixed energy splitting ratio can be employed. For example, such a splitter can have a ratio in the range 1:2-1:5, such that the higher energy portion is coupled into the particle dump arm, i.e. the third waveguide. Such waveguides are fairly straightforward and cost-effective to implement. The drawback of this design, however, is that a larger portion of the intensity is coupled to the dump arm, thus reducing the overall sensor performance in terms of energy consumption and/or signal to noise ratio particularly in the measurement phase.

Secondly, a selective waveguide splitter with splitting characteristics with respect to wavelength or polarization can be employed. For example, the controller can be configured to set the first intensity in the first waveguide with a first polarization and/or a first wavelength during the measurement phase, and to set the second intensity in the first waveguide with a second polarization and/or a second wavelength during the cleaning phase. Therein, the first and second wavelengths as well as the first and second polarizations are distinct from each other.

Well-defined selective splitting can be achieved based on differences in wavelength or polarization of the propagating modes. For instance, planar-type polarization beam splitters based on a bridged silicon waveguide coupler can be realized to separate the TM and TE modes. Following this approach, the TE mode can be employed during the cleaning phase and the TM mode during the measurement phase.

Alternatively, dichroic beam splitters, or spectrally selective waveguides, can be optimized to achieve nearly 100% splitting ratio for light of different wavelengths during measurement and cleaning phases. As an added benefit, the support of different wavelengths can allow to suitably design the penetration depth of the evanescent field to be optimal for cleaning and measurement operation, respectively.

Thirdly, the waveguide splitting can realized using active tuning elements, such as electro-optical materials, MEMS switches, piezo-like transparent materials, such as PVDF copolymers, or thermal tuning. The advantage of this scheme is to provide 100% efficiency in both the measurement and the cleaning phases. The disadvantage is an increased effort regarding system integration and the need for additional controls for the active operation.

In some embodiments, during the measurement phase the controller is further configured to output an indication of a particle number and/or size of the accumulated particulate matter based on the determined change.

The induced dragging forces and particle speeds are dependent on particle size and chemical composition of the particulate matter. Thus, additional information on e.g. the particle size distribution, or the composition of the deposited aerosol particles can be gained from a detector according to the improved concept.

In some embodiments, the first waveguide in the interrogation region and/or the second waveguide comprises a thin-film coating, in particular a thin-film Parylene or PTFE coating.

A thin film of a suitable material in cladding-free regions of the waveguides could be used to fine tune the adhesion properties of the particles on the exposed surfaces of the waveguide structures, i.e. the active interrogation region and the dump arm. For instance, materials with high surface energy, such as Parylene or PTFE, could be applied using vapor deposition techniques.

In some embodiments, the particulate matter detector further comprises a waveguide combiner and a further light emitter. Therein, the light emitter is configured to provide the first intensity and the further light emitter is configured to provide the second intensity. The waveguide combiner couples the light emitter and the further light emitter to the first waveguide.

Combined with the aforementioned wavelength or polarization dependent waveguide splitters, different light emitters outputting said different wavelengths and/or polarizations can be employed in order to achieve well-defined selective splitting. In this case, the controller is configured to activate the emission of the light emitter during the measurement phase, and to activate the emission of the further light emitter during the cleaning phase. For combining light from the light emitter and the further light emitter, a waveguide combiner, i.e. a splitter operated in reverse, can be coupled between the emitters and the first waveguide of the waveguide structure.

The aforementioned object is further solved by a method for detecting particulate matter. The method comprises, during a measurement phase, accumulating particulate matter from a gaseous environment directly on a cladding-free surface of a first waveguide within an interrogation region, guiding light from a light emitter through the first waveguide to a waveguide splitter at a first intensity, splitting by means of the waveguide splitter at least a portion of the light from the first waveguide into a second waveguide that is coupled to a detector, detecting an intensity of light within the second waveguide and determining a change in the intensity of the light detected by the detector, and outputting an indication of an opacity of the surface of the first waveguide with the accumulated particulate matter thereon based on the determined change.

The method, during a cleaning phase, comprises guiding light from the light emitter through the first waveguide to the waveguide splitter at a second intensity that is larger than the first intensity, splitting by means of the waveguide splitter at least a portion of the light from the first waveguide into a third waveguide that is free of cladding, and directing the accumulated particulate matter from the interrogation region to the third waveguide via optical forces.

Aspects of the method as well as further embodiments of the method according to the improved concept become apparent to a person skilled in the art from the embodiments of the particulate matter detector described above.

The following description of figures of exemplary embodiments may further illustrate and explain aspects of the improved concept. Components and parts with the same structure and the same effect, respectively, appear with equivalent reference symbols. Insofar as components and parts correspond to one another in terms of their function in different figures, the description thereof is not necessarily repeated for each of the following figures.

In the figures:

FIG. 1 shows a first embodiment of a particulate matter detector 1 according to the improved concept during a measurement, or sensing or detection, phase.

Figure 1:
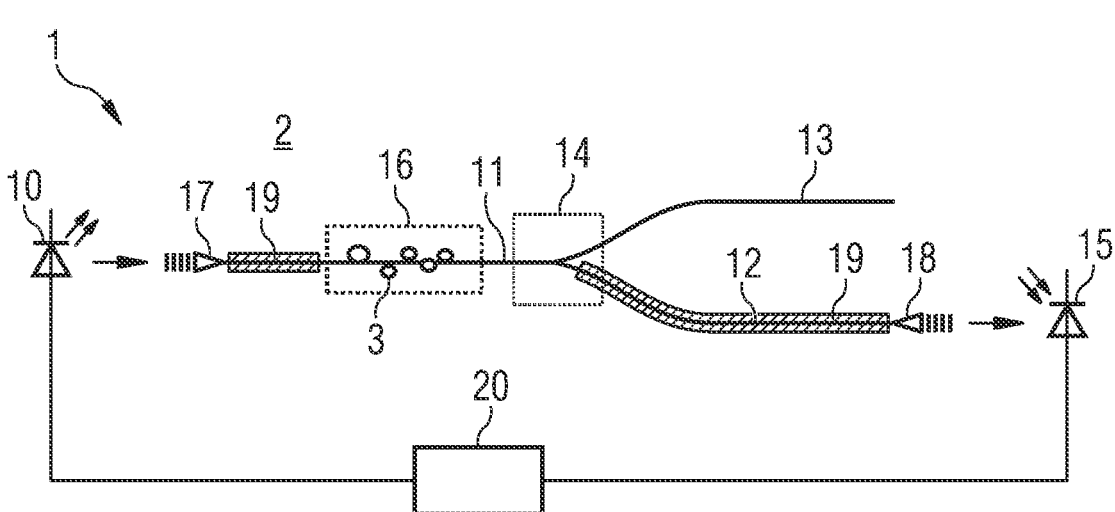
FIGS. 1 and 2 show a first exemplary embodiment of a particulate matter detector according to the improved concept.

The particulate matter detector 1 in this embodiment comprises a light emitter 10, which is a semiconductor laser or a light-emitting diode, LED, for instance, and is configured to emit light. The particulate matter detector 1 further comprises a waveguide structure including a first waveguide 11, a second waveguide 12 and a third waveguide 13. The waveguides of the waveguide structure can be of a glass, a dielectric material such as a silica, e.g. silicon dioxide, or silicon nitride.

The first waveguide 11 is coupled to the second and third waveguides 12, 13 via a waveguide splitter 14, e.g. a y-splitter with a fixed energy splitting ratio that can be in the order of 5:1 to 10:1, wherein the output of the waveguide splitter 14 with the larger energy splitting is coupled to the third waveguide 13.

The first waveguide 11 is coupled to the light emitter 10 via a first grating coupler 17, which is configured to couple the light emitted by the light emitter 10 from free space into the first waveguide 11. Likewise, the second waveguide 12 is coupled to the detector 15 via a second grating coupler 18, which is configured to couple the light from the second waveguide 12 to free space towards the detector 15. The detector 15 is a photodiode, for example it is a silicon photodiode that has a detection sensitivity in a range, in which the light emitter 10 emits light and in which the waveguide structure guides light.

For example, the first grating coupler 17 is a structured input portion of the first waveguide 11. Alternatively, the first grating coupler 17 is a structured region having a grating on top of or below an input portion of the first waveguide 11.

The first waveguide 11 further comprises an active interrogation region 16 characterized by a cladding-free portion of the first waveguide 11. In addition, the waveguide in the interrogation region 16 can be thinned down, e.g. tapered, and compared to portions of the first waveguide 11 outside the interrogation region 16. Furthermore, the first waveguide 11 between the interrogation region and the waveguide splitter 14 is likewise cladding-free and optionally also thinned down. In contrast, the portion of the first waveguide 11 between the active interrogation region 16 and the first grating coupler 17 can comprise a cladding 19.

The particulate matter detector 1, in particular the active interrogation region 16, i.e. the exposed surface of the first waveguide 11 in this region, is exposed to a gaseous environment 2, e.g. air, having particles of particulate matter 3. Particulate matter 3, e.g. due to adhesion forces or optical forces induced by an evanescent field created by light propagating through the first waveguide 11 in the interrogation region 16, accumulates on the first waveguide 11, thus disturbing the evanescent field and reducing the amount of light propagating to the waveguide splitter 14 compared to the case, in which no particulate matter is accumulated on the first waveguide 11. Thus, also the light intensity split from the first waveguide 11 into the second waveguide 12 is reduced such that, during a measurement or detection phase, a signal detected by the optical detector 15 can indicate whether particles are accumulated on the first waveguide 11 within the interrogation region 16. Moreover, the amplitude of the signal drop due to the reduced light intensity can correspond to the approximate size of the particles, opening the possibility to measure both number of particles and their size distribution.

Specifically, when electromagnetic waves traveling in a medium, such as the waveguide structure, undergo total internal reflection at a boundary, an evanescent field is generated in close vicinity of the interface, e.g. formed by a cladding-free portion of the first waveguide 11. By placing particles, e.g. particulate matter 3, in direct vicinity of the interface, the evanescent field gets disrupted, absorbed or scattered, resulting in a decreased field intensity of the propagating light. This attenuation is proportional to the particle size deposited on the interface. Counting the occurrence of individual transient events allows one to detect single particle depositions, while the amplitude of these events change allows the size estimation of the particle.

For such a measurement, the controller 20 can read out the signal generated by the detector 15, deduce the detected light intensity and compare this to a known intensity, e.g. an output intensity of the light emitter 10, in particular the first intensity which is set by the controller 20. Moreover, based on this comparison, the controller 20 can be configured to output a signal that indicates an opacity of the first waveguide 11 in dependence of particulate matter 3 accumulated on the first waveguide 11, in turn giving an estimate on said number of particles and/or their size distribution.

In addition, the waveguide splitter 14, as mentioned above, also couples the first waveguide 11 to the third waveguide 13. This third waveguide 13, at least in a portion that extends from the waveguide splitter 14, is free of cladding such that a significant evanescent field is created at the surface of the third waveguide 13 if light propagates through the third waveguide 13. However, during the measurement phase, the light within the third waveguide 13 plays no active role. In particular, the first intensity is set, such that an optimal tradeoff is achieved. In other words, the first intensity is set such that an optimal signal and sensitivity at the detector 15 is achieved, e.g. in terms of a signal-to-noise ratio, while ensuring that optical forces exerted onto the particulate matter 3 accumulated in the interrogation region 16 are small enough not to cause the particles to move along the first waveguide 11.

The second waveguide 12 has a cladding 19 in order to reduce the evanescent field at its surface and thus to prevent particles from accumulating on the second waveguide 12 or being moved from the interrogation region 16 via the waveguide splitter 14 towards the second waveguide 12.

Figure 2:
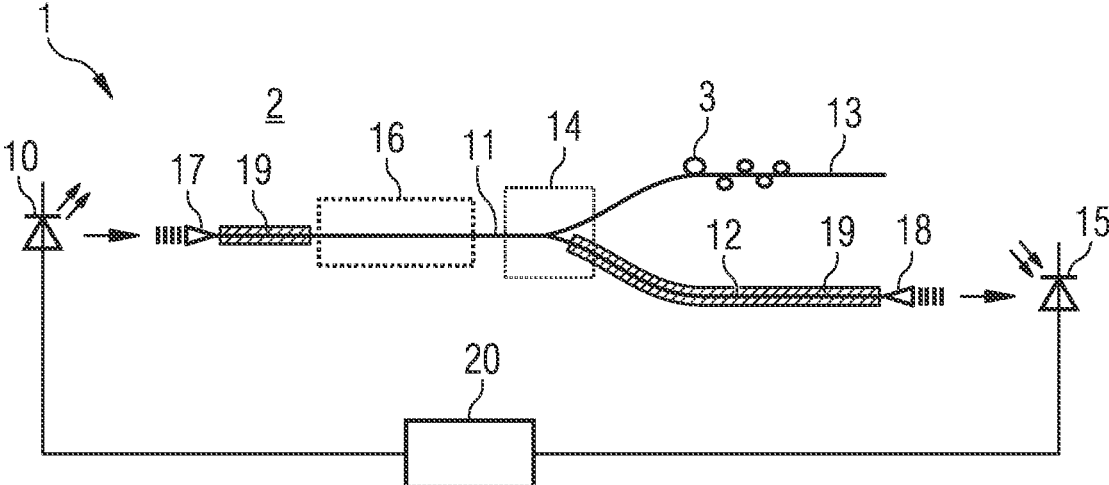

FIG. 2 shows the first embodiment of a particulate matter detector 1 according to the improved concept of FIG. 1 during a cleaning, or decontamination, phase.

During the cleaning phase, the controller 20 sets the second intensity, e.g. by increasing the output power of the light emitter 10 from the first intensity to more than 50 mW, for instance. This cleaning phase can be activated for a predetermined amount of time, e.g. several minutes, or until a certain minimum threshold signal level at the detector 15 is achieved or surpassed.

The second intensity is high enough to create an evanescent field at the cladding-free regions of the waveguide structure, i.e. within the interrogation region 16, the portion of the first waveguide 11 between the interrogation region 16 and the waveguide splitter 14, and the cladding-free portion of the third waveguide 13, wherein the evanescent field in these regions is strong enough to induce an optical force with pico-Newton magnitude, generated by the radiation pressure on a small particle illuminated by an evanescent electromagnetic wave, i.e. a scattering force that is approximately proportional to the magnitude of the electric field and a gradient force that is proportional to the magnitude of the gradient of the electric field, which causes a motion of particulate matter 3 accumulated on the first waveguide 11 towards the waveguide splitter 14 and onto the third waveguide 13. The motion occurs at speeds up to 15 μm/s, for instance. Said particles are prevented from reaching the second waveguide 12 by the splitting ratio of the waveguide splitter 14 but also due to the fact that the second waveguide can comprise a cladding 19 thick enough to reduce the evanescent field at its surface.

This way, the cleaning phase efficiently removes particulate matter 3 from the first waveguide 11, and particularly from the interrogation region 16, by dumping them onto the third waveguide 13, which can be understood as a particle dump, which does not contribute to the measurement during the measurement phase. This way, a contactless in-situ particle removal is realized, which dramatically increases the lifetime and sensitivity of the particulate matter detector 1 without the requirement of replacement of parts or external cleaning. In addition, by monitoring the signal at the detector 15 also during the cleaning phase, additional information on e.g. the particle size distribution, or the composition of the deposited aerosol particles, can be gained as dragging forces and particle speeds are dependent on particle size and chemical composition.

Figure 3:
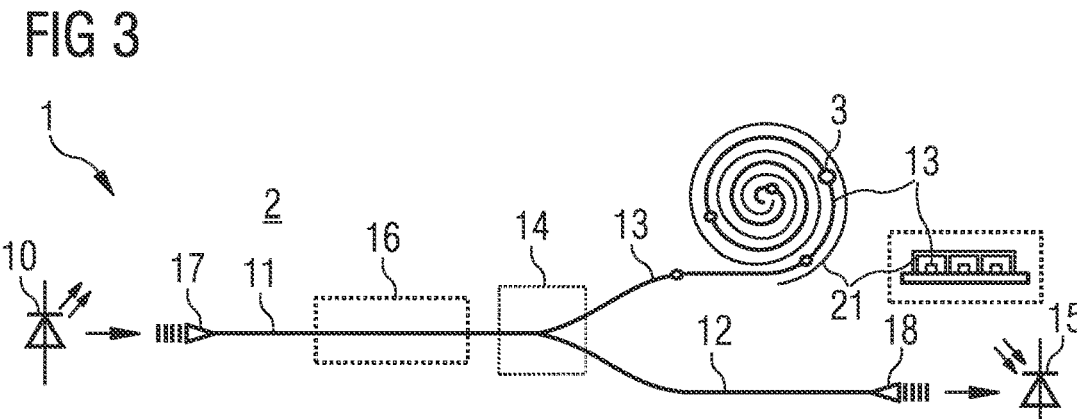
FIG. 3 shows a second exemplary embodiment of a particulate matter detector according to the improved concept.

FIG. 3 shows a second embodiment of a particulate matter detector 1 according to the improved concept that is based on the first embodiment of FIGS. 1 and 2. In contrast to the first embodiment, the second embodiment is characterized by several distinct aspects. Firstly, the third waveguide 13 has a significantly longer length compared to the second waveguide 12. This allows for accommodating a larger number of particles on the third waveguide 13, thus effectively increasing the size of the particle dump. In order to maintain a reasonable footprint of the particulate matter detector 1, e.g. on a chip or glass substrate, the third waveguide 13 can be arranged using shapes like spirals, as shown, meanders or the like.

Secondly, the third waveguide 13 can be thinned down in the particle dump region, thus increasing the evanescent field and therefore producing stronger optical forces for efficiently trapping the dumped particles.

Thirdly, the second embodiment further comprises an enclosure 21 that is arranged in a manner such that the third waveguide 13 is not exposed to the gaseous environment. As the zoomed view within FIG. 3 shows, the enclosure 21 can be a labyrinth-type enclosure that is likewise spiraled in this embodiment and fully encloses the third waveguide 13 together with a substrate body the particulate matter detector 1 is arranged on. Once the particles are dragged into the spiral cavity, the enclosure 21 prevents them from easily escaping and contaminating the active interrogation region 16, even when they get loose or released from the waveguide, particularly if the first intensity is set during a subsequent measurement phase, for instance. This trap can further be combined with other techniques of trapping that support keeping the particles in place, based e.g. on electro- or thermophoresis, which are known concepts and not further detailed in this disclosure.

Figure 4:
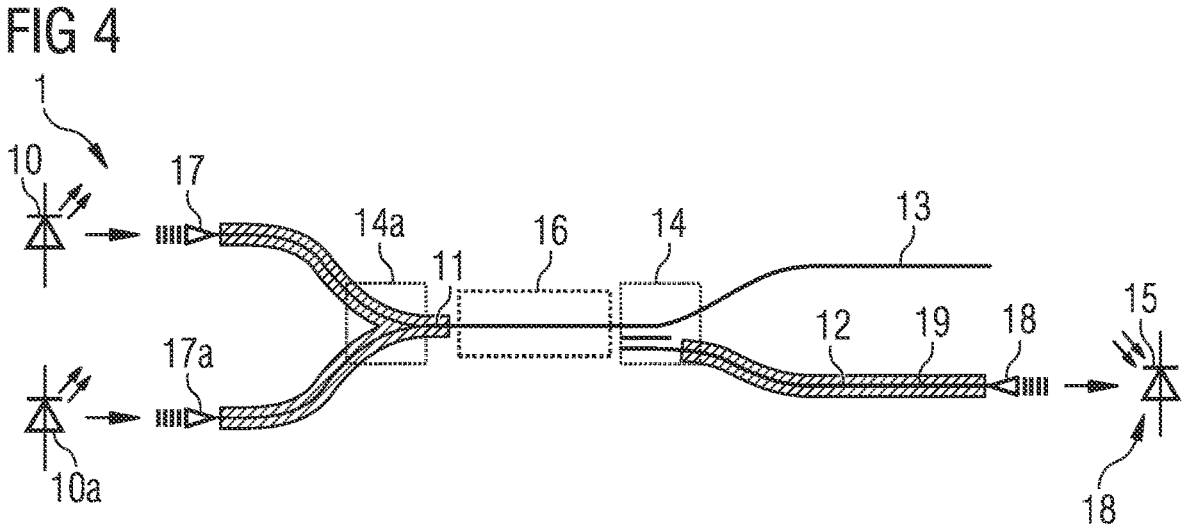
FIG. 4 shows a third exemplary embodiment of a particulate matter detector according to the improved concept.

FIG. 4 shows a third embodiment of a particulate matter detector 1 according to the improved concept that is based on the first embodiment of FIGS. 1 and 2. In contrast to the first embodiment, this embodiment is characterized by a further light emitter 10a.

The light emitted by the light emitter 10 and the further light emitter 10a are coupled to the first waveguide 11 via respective first grating couplers 17, 17a and a waveguide combiner 14a, e.g. implemented as a y-shaped waveguide splitter operated in reverse. For example, the first grating couplers 17, 17a and the waveguide combiner 14a are polarization-maintaining elements.

For example, the light emitter 10 is configured, upon activated output, to emit light at the second intensity, wherein the emitted light is TE (transversal electric) polarized. Thus, the light emitter 10 in this embodiment can be understood as a cleaning light emitter. In contrast, the further light emitter 10a is configured, upon activated output, to emit light at the first intensity, wherein the emitted light is TM (transversal magnetic) polarized. Thus, the further light emitter 10a in this embodiment can be understood as a measurement light emitter. Therein, an output intensity of the further light emitter 10a is lower than an output intensity of the further light emitter 10 in accordance with the improved concept. Furthermore, for selectively setting the first and second intensities during the respective phases, the controller 20 in this embodiment can be configured to activate and deactivate the emitting of light of the light emitter 10 and the further light emitter 10a.

In consequence, the waveguide splitter 14 in this embodiment has splitting characteristics that are polarization-dependent. For example, the waveguide splitter 14 is a planar-type polarization beam splitter based on a bridged silicon waveguide coupler. The waveguide splitter 14 is configured to couple, from the first waveguide 11, TE-polarized light into the third waveguide 13 and TM-polarized light into the second waveguide 12. This way, well-defined selective splitting close to 100% efficiency can be achieved, thus ensuring efficient dumping of particulate matter 3 onto the third waveguide 13 during the cleaning phase, and a highly-sensitive measurement during the measurement phase as substantially no measurement light is coupled to the third waveguide 13 in such an embodiment.

Instead of the light from the light emitter 10 and the further light emitter 10a being distinct in terms of polarization, in an alternative embodiment the light from the two emitters can be distinct in terms of the wavelength. For example, the light emitter 10 is configured, upon activated output, to emit light at the second intensity and at a second wavelength. In contrast, the further light emitter 10a is configured, upon activated output, to emit light at the first intensity and at a first wavelength that is distinct from the second wavelength. Likewise, an output intensity of the further light emitter 10a is lower than an output intensity of the further light emitter 10 in accordance with the improved concept.

The waveguide splitter 14 in this embodiment has splitting characteristics that are wavelength-dependent. For example, the waveguide splitter 14 is a dichroic beam splitter or comprises spectrally selective waveguides. The waveguide splitter 14 in this embodiment is configured to couple, from the first waveguide 11, light at the second wavelength into the third waveguide 13 and light at the first wavelength into the second waveguide 12. This way, also well-defined selective splitting close to 100% efficiency can be achieved, thus ensuring efficient dumping of particulate matter 3 onto the third waveguide 13 during the cleaning phase, and a highly-sensitive measurement during the measurement phase as also in such an embodiment, substantially no measurement light is coupled to the third waveguide 13 in such an embodiment.

Alternatively to polarization or wavelength dependent splitting, the waveguide splitting can also be realized using active tuning elements as part of the waveguide splitter 14. For example, the waveguide splitter 14 can have a working principle that is based on electro-optical materials, MEMS switches, piezo-like transparent materials, such as PVDF copolymers, or thermal tuning. The advantage of this scheme is to provide 100% efficiency in both measurement and cleaning cycles.

Furthermore, in all embodiments of a particulate matter detector 1 according to the improved concept, a thin film of a suitable material can be deposited onto cladding-free portions of the waveguide structure for adjusting the adhesion properties of the particles on the non-clad surfaces, i.e. the active interrogation region and the dump arm. For instance, materials with high surface energy, such as Parylene or PTFE, can be applied using vapor deposition techniques.

It is further pointed out that a particulate matter detector 1 according to the improved concept is not limited to applications for particulate matter sensing. The improved concept can likewise be implemented in all types of particle sensing devices in a gaseous or fluid environment.

The embodiments of the particulate matter detector and the operating method herein have been discussed for the purpose of familiarizing the reader with novel aspects of the idea. Although preferred embodiments have been shown and described, many changes, modifications, equivalents and substitutions of the disclosed concepts may be made by one having skill in the art without unnecessarily departing from the scope of the claims.

In particular, the disclosure is not limited to the disclosed embodiments, and gives examples of as many alternatives as possible for the features included in the embodiments discussed. However, it is intended that any modifications, equivalents and substitutions of the disclosed concepts be included within the scope of the claims which are appended hereto.

Features recited in separate dependent claims may be advantageously combined. Moreover, reference signs used in the claims are not limited to be construed as limiting the scope of the claims.

Furthermore, as used herein, the term "comprising" does not exclude other elements. In addition, as used herein, the article "a" is intended to include one or more than one component or element, and is not limited to be construed as meaning only one.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

This patent application claims the priority of German patent application 10 2021 116 522.9, the disclosure content of which is hereby incorporated by reference.

REFERENCES

1 particulate matter detector
2 gaseous environment
3 particulate matter
10, 10a light emitter
11, 12, 13 waveguide
14 waveguide splitter
14a waveguide combiner
15 detector
16 interrogation region
17, 17a, 18 grating coupler
19 cladding
20 controller
21 enclosure

The invention claimed is:

1. A particulate matter detector, comprising:
a light emitter configured to emit light;
a first, a second and a third waveguide, the third waveguide being free of cladding;
a waveguide splitter;
a detector; and
a controller,
wherein the first waveguide is coupled to the light emitter and is configured to guide the emitted light towards the waveguide splitter, the first waveguide comprising an interrogation region formed by a cladding-free surface of the first waveguide, the surface being exposed to a gaseous environment and configured to accumulate directly thereon particulate matter from the gaseous environment;

wherein the waveguide splitter couples the interrogation region of the first waveguide to the second waveguide and to the third waveguide;

wherein the detector is coupled to the second waveguide and configured to detect an intensity of light that is split from the interrogation region into the second waveguide by the waveguide splitter; and wherein the controller is configured to during a measurement phase, set a first intensity of the light coupled into the first waveguide, determine a change in the intensity of the light detected by the detector, and output an indication of an opacity of the surface of the first waveguide with the accumulated particulate matter thereon based on the determined change; and during a cleaning phase, set a second intensity of the light coupled into the first waveguide that is larger than the first intensity for directing the accumulated particulate matter from the interrogation region to the third waveguide via optical forces.

2. The particulate matter detector according to claim 1, wherein the controller determines the indication of the opacity by comparing the detected intensity with the first intensity.

3. The particulate matter detector according to claim 1, wherein the first waveguide is coupled to the light emitter via a first grating coupler; and/or the second waveguide is coupled to the detector via a second grating coupler.

4. The particulate matter detector according to claim 1, wherein a length of the third waveguide is larger than a length of the second waveguide.

5. The particulate matter detector according to claim 1, wherein the third waveguide forms a spiral or a meander trap.

6. The particulate matter detector according to claim 1, wherein the third waveguide at least in some regions is thinned down.

7. The particulate matter detector according to claim 1, wherein the first waveguide at least in a portion of the interrogation region is thinned down.

8. The particulate matter detector according to claim 1, further comprising an enclosure that covers at least a portion of the third waveguide.

9. The particulate matter detector according to claim 1, wherein the second waveguide comprises a cladding.

10. The particulate matter detector according to claim 1, wherein the waveguide splitter is one of:

a passive waveguide splitter having a fixed energy splitting ratio, wherein a higher energy portion is split from the interrogation region into the third waveguide;

a selective waveguide splitter characterized by a polarization or wavelength dependent energy splitting ratio; and an active waveguide splitter operable to selectively couple light from the interrogation region into the second and third waveguide.

11. The particulate matter detector according to claim 1, wherein during the measurement phase the controller is further configured to output an indication of a particle number and/or size of the accumulated particulate matter based on the determined change.

12. The particulate matter detector according to claim 1, wherein the first waveguide in the interrogation region and/or the second waveguide comprises a thin-film coating, in particular a thin-film Parylene or PTFE coating.

13. The particulate matter detector according to claim 1, further comprising a waveguide combiner and a further light emitter, wherein the light emitter is configured to provide the first intensity and the further light emitter is configured to provide the second intensity; and the waveguide combiner couples the light emitter and the further light emitter to the first waveguide.

14. A method for detecting particulate matter, the method comprising:

during a measurement phase:

accumulating particulate matter from a gaseous environment directly on a cladding-free surface of a first waveguide within an interrogation region;

guiding light from a light emitter through the first waveguide to a waveguide splitter at a first intensity;

splitting by means of the waveguide splitter at least a portion of the light from the first waveguide into a second waveguide that is coupled to a detector;

detecting an intensity of light within the second waveguide and determining a change in the intensity of the light detected by the detector; and outputting an indication of an opacity of the surface of the first waveguide with the accumulated particulate matter thereon based on the determined change; and during a cleaning phase:

guiding light from the light emitter through the first waveguide to the waveguide splitter at a second intensity that is larger than the first intensity;

splitting by means of the waveguide splitter at least a portion of the light from the first waveguide into a third waveguide that is free of cladding; and directing the accumulated particulate matter from the interrogation region to the third waveguide via optical forces.

15. A particulate matter detector, comprising:

a light emitter configured to emit light;

a first, a second and a third waveguide, the third waveguide being free of cladding;

a waveguide splitter;

a detector; and a controller, wherein the first waveguide is coupled to the light emitter and is configured to guide the emitted light towards the waveguide splitter, the first waveguide comprising an interrogation region formed by a cladding-free surface of the first waveguide, the surface being exposed to a gaseous environment and configured to accumulate directly thereon particulate matter from the gaseous environment;

wherein the waveguide splitter couples the interrogation region of the first waveguide to the second waveguide and to the third waveguide;

wherein the detector is coupled to the second waveguide and configured to detect an intensity of light that is split from the interrogation region into the second waveguide by the waveguide splitter;

wherein the third waveguide is configured as a dump for particulate matter that has accumulated on the cladding-free surface of the first waveguide; and wherein the controller is configured to during a measurement phase, set a first intensity of the light coupled into the first waveguide, determine a change in the intensity of the light detected by the detector, and output an indication of an opacity of the surface of the first waveguide with the accumulated particulate matter thereon based on the determined change; and during a cleaning phase, set a second intensity of the light coupled into the first waveguide that is larger than the first intensity for directing the accumulated particulate matter from the interrogation region to the third waveguide via optical forces.

\* \* \* \* \*